United States Patent [19]
Montemayor et al.

[11] Patent Number: 5,385,023
[45] Date of Patent: Jan. 31, 1995

[54] DRY ICE PELLETIZER

[76] Inventors: Arthur A. Montemayor, 17002 Hillview La., Spring, Tex. 77379; Karl H. Werr, 9404 Magic Falls, Garden Ridge, Tex. 78266

[21] Appl. No.: 98,470

[22] Filed: Jul. 28, 1993

[51] Int. Cl.$^6$ .............................................. F25J 1/00
[52] U.S. Cl. ................................................ 62/10; 62/35
[58] Field of Search ................................ 62/10, 12, 35

[56] References Cited

U.S. PATENT DOCUMENTS

| | | | |
|---|---|---|---|
| 2,153,629 | 4/1939 | Kobold | 62/10 |
| 2,464,089 | 3/1949 | Jones | 62/10 |
| 3,098,361 | 1/1963 | Haase | 62/10 |
| 3,835,657 | 9/1974 | Scudder | 62/35 |
| 3,901,044 | 8/1975 | Vahl | 62/35 |
| 3,952,530 | 4/1976 | Tyree, Jr. | 62/35 |
| 4,412,852 | 11/1983 | Umino et al. | 62/35 |
| 4,780,119 | 10/1988 | Brooke | 62/12 |

Primary Examiner—Ronald C. Capossela
Attorney, Agent, or Firm—Gunn & Kuffner

[57] ABSTRACT

A dry ice pelletizer includes a ram structure that eliminates the need for piston rings to form the pellets thereby eliminating contamination of the pellets from piston ring wear products and piston/cylinder lubricants. The ram structure is pulled down into compression contact with dry ice snow formed in a snow chamber by a pair of hydraulic actuators coupled to a crosshead. The physical separation of the ram and the actuators further eliminates the source of contamination from hydraulic actuator fluid.

20 Claims, 8 Drawing Sheets

DRY ICE PELLETIZER

FIELD OF THE INVENTION

The present invention relates generally to the field of dry ice manufacture and, more particularly, to a method and machine for the high volume manufacture of contaminant-free dry ice pellets.

BACKGROUND OF THE INVENTION

Dry ice (DI) is pure, solid-state carbon dioxide ($CO_2$). Dry ice is normally produced by compacting or pressing crystalline, snow-like $CO_2$ while it is in the solid state at approximately atmospheric pressure (14.7 psig) and $-109.33°$ F. Although dry ice can also be produced by sub-cooling liquid carbon dioxide ($LCO_2$), compaction is the preferred method presently used. Mechanical or hydraulic devices are the usual mechanisms used for compaction yielding approximately 92 to 97 lb/cubic foot bulk density of the final product.

In order to produce $LCO_2$, the essential feed material of the dry ice process, it is necessary to obtain, purify, compress, and liquefy a stream of carbon dioxide gas. This $CO_2$ gas is usually obtained front an impure by-product stream in a chemical processing plant, a fermentation process, or a natural $CO_2$ well. Standard industry methods produce bulk $LCO_2$ that is stored, transported, and distributed at pressurized conditions of approximately 250 psig and $-8°$ F. It is from this basic feed stock that dry ice is usually manufactured.

Dry ice has been traditionally produced and distributed in blocks, typically $10'' \times 10'' \times 10''$. Such blocks weigh about 55 lbs and do not complement the various consumption methods preferred by consumers. Use of block dry ice is cumbersome, labor intensive, and expensive and requires time and expense to crush the blocks in order to reduce them to a reasonable size that be easily handled and used in many applications.

Due to these drawbacks in the use of dry ice in block form, many applications have found the use of dry ice in pellets or nuggets to be more convenient. Such pellets are commonly produced in dry ice pelletizers which are relatively smaller and less expensive than earlier dry ice machines. Pellets are more easily packaged by a manufacturer or subdivided by a consumer into convenient portions which also saves on labor costs.

Unfortunately, no known pelletizer has been available that produces pellets at a rate comparable to existing block presses (nominal capacity of 25 tons/day). To match this capacity requires the use of a plurality of pelletizers which is often not cost effective.

Pellets also have much greater surface for a given quantity of dry ice than blocks. This results in larger sublimation losses during production, storage, and distribution of the dry ice representing a direct economic loss for producers and their customers. Thus, there remains a need for a high volume production pelletizer to reduce the time required to produce a given quantity of dry ice pellets to reduce these sublimation losses.

Dry ice pelletizers produce pellets of dry ice from $LCO_2$. These dry ice pellets find a vast array of applications, including applications in the processing and preservation of meats and other foods because of the thermal, physical, and chemical properties of dry ice. In certain applications, the dry ice pellets come in intimate contact with the food being processed, such as in a meat packing house and in certain seafood processing plants. The dry ice pellets in these applications are delivered directly onto the food being processed to rapidly cool the food and to keep the food below a specified maximum temperature to prevent spoilage while processing and prior to refrigerated storage. Also, dry ice has long been the favored refrigerant for ice cream vendors and distributors.

Dry ice is the preferred means of cooling in such applications since it imparts no color, odor, or taste and has no lingering deleterious effect on the food. Dry ice pellets are even mixed directly into certain batters to keep the batters cold and fresh. For this reason, the dry ice must be pure and free of all contaminants.

In its solid state at standard temperature and pressure, $CO_2$ has a constant and stable temperature of minus $109.33°$ F., well below that of many common refrigerants such as ammonia, and has a refrigeration value of 246.25 BTUs per pound. Carbon dioxide is normally transported in its liquid state and stored in refrigerated storage tanks at a pressure of 250 psig and a corresponding temperature of $-8°$ F.

Dry ice provides another attractive feature in that it sublimes (transforms from the solid to the gaseous phase directly, without going through the liquid phase) and, therefore, leaves no residue after yielding its refrigeration effect; no post clean-up or removal of residual liquid is required. Furthermore, $CO_2$ is neither toxic, poisonous, reactive with other chemicals, nor flammable. In fact, $CO_2$ is commonly used as a fire fighting agent.

When liquid $CO_2$ is permitted to flash through an expansion device into a chamber (referred to herein as a "snow chamber") at atmospheric pressure from the nominal 250 psig, the liquid flashes to a vapor (referred to herein as revert) and in the process removes the heat of vaporization from the remaining liquid rapidly cooling the liquid to the solid phase in the form of snow. The proportionate amounts of snow and revert depend on the pressure and temperature of the $LCO_2$ fed to the expansion device. The lower the pressure and temperature of the feed $LCO_2$, the greater the proportion of snow formed as a result of the free expansion. Rapidly expanding liquid $CO_2$ at 250 psig and $-8°$ to atmospheric pressure yields about one pound of dry ice as snow and 1.08 pounds of vapor at $-109.33°$ F. This snow may then be compacted through various processes to form blocks or pellets of dry ice.

In order to provide a truly competitive pelletizer system, recovery of revert gas requires compressing and cooling the collected revert to system conditions, commonly 250 psig and $-8°$ F., to recover the $CO_2$ as liquid feed stock. To reduce the amount of revert produced per pound of feed stock introduced, some pelletizers use a small heat exchanger to pre-chill the $LCO_2$ below its $-8°$ F. saturation temperature. Revert from the snow chamber may be used to pre-chill feed stock. This technique helps a little, but is an unmanageable situation danger of over cooling and freezing feed stock into a solid mass. Experience has demonstrated that this is an unmanageable situation and, as a result, a small, token heat exchanger is used. Thus, there remains a need for a pelletizer system that recovers 100% of the revert gas that can operate continuously and unattended.

Known dry ice pelletizers, such as that shown in Brooke, U.S. Pat. No. 4,780,119 and assigned to TOM-CO2 Equipment Company, commonly use a piston to compress dry ice snow into a block or to compress and extrude the dry ice through a die. Piston devices include piston rings to maintain pressure for compression and such piston devices have several known drawbacks which known pelletizers have been unable to solve. First, piston rings, by their very nature, come into rubbing contact with the cylinder wall surrounding them causing wear and resultant wear products from whatever material the rings are made of, often metal. Metal wear products are unacceptable contaminants in dry ice that will be used in many applications, such as in food processing. Pistons often require some sort of lubricant to prevent piston rings failure and such lubricants also provide an undesirable source of contamination of the dry ice product.

Another problem with known piston operated systems is the hazard of "blow-by" whereby snow blows by the piston rings and accumulates behind the piston. This can ultimately result in rod seal rupture.

While the Brooke machine is the most capable machine known to the inventors, it suffers in that it is a horizontal, hydraulic type pelletizer. It is limited to approximately 600 lb/hr per cylindrical chamber used. (Two chambers have been hydraulically linked to increase the capacity of a skid-mounted unit to 1200 lb/hr. In addition to the contamination previously described, the Brooke machine, unlike the present invention, is unnecessarily complex and is subject to all of the shortcomings inherent in complexity, including cost and parts subject to wear and failure. Also, the Brooke machine only produces pellets as an intermediate product and is intended to produce solid disks of dry ice.

The Brooke machine with its horizontal construction suffers yet another drawback. The hydraulic element (i.e., piston rod) that performs the compaction is under a compressive force during compaction. This means that the hydraulic element is subject to side loading that may cause buckling and consequent misalignment. Further, since the dry ice snow is heavier than the surrounding vapor, the snow falls to the bottom wall of the snow chamber cylinder. Then, when the snow is compacted against the die, it tends to result in an uneven extrusion, denser at the bottom of the die and less dense above the bottom.

Other known pelletizers provide one chamber for the expansion of the $LCO_2$ and a separate chamber for compaction and extrusion of the pellets. The expansion chamber also separates the revert from the snow. In such machines, snow is produced in an expansion chamber and allowed to fall by gravity into the compaction chamber. While this technique increases the production rate of the pelletizer, production often becomes erratic due to agglomeration of the snow in the expansion chamber. To correct this problem and to keep the snow more consistently flowing into the compaction chamber, known systems have used "rabble" arms or other vibrating devices in cooperation with the expansion chamber. This makes for an expensive and complicated machine with more moving and wearing pans in contact with the snow.

An alternative to an external expansion chamber uses the compaction chamber as a 2-phase separator as well. This puts constraints and demands on the chamber, since it must carry out two sequential unit operations within one chamber and the chamber must have a revert outlet of sufficient capacity that the revert velocity does not entrain and carry out solid snow with it. Snow entrained in the revert can cause plugs, excess chamber pressure, and production stoppage.

Thus, there remains a need for a dry ice pelletizer that is simple in construction and eliminates the possibility of contamination from corrosion and wear products or from lubricants to produce food-grade (FDA) quality pellets consistently and economically. Such a pelletizer should provide marked increased throughput of dry ice product and develop more uniform dry ice pellets. Such a pelletizer should also provide safe and reliable operation for an extended period of time in automatic operation. The pelletizer should provide for the recovery of revert without modifications to the pelletizer and without snow entrainment with the revert which can cause stoppages or inconsistent operation. Such a pelletizer should also provide for portable operation so that the pelletizer can operate at the consumption site, thereby circumventing costly sublimation loss during storage and transportation of the product dry ice.

SUMMARY OF THE INVENTION

In the present invention, a vertical, stainless steel ram is used to extrude the pellets, rather than a piston. This eliminates solid snow getting in back of a piston assembly (i.e., blow-by) and rupturing the rod seals. The vertical ram construction of the present invention eliminates this phenomenon of "blow-by" since there is no volume beyond the ram into which the snow can escape.

Further, since no piston rings are used in a ram arrangement, there is no metal-to-metal contact in the snow chamber, thereby eliminating contamination of the resultant pellet product. There are fewer parts used in the assembly due to the inherent simplicity of the present invention.

A vertical orientation is employed, giving a more compacted and evenly distributed snow charge prior to compressing the snow within the chamber—resulting in smooth, even operation and less work required. This also eliminates lateral forces and side loading on all reciprocating parts.

The hydraulic power system is totally isolated from the vicinity of the show chamber, making lubricant contamination of the product impossible. The required extrusion hydraulic force is transmitted to the ram indirectly through use of a cross-head design that distributes the work between two side hydraulic cylinders. Dividing the work between two cylinders allows the use of smaller, standard-sized hydraulic cylinders instead of using one, larger, custom-designed and more expensive hydraulic cylinder.

Instead of positioning the hydraulic piston(s) and cylinder(s) on top of (or behind) the snow chamber, the hydraulic cylinders are located beneath a structural table and act with their respective piston rods in tension. This helps to maintain proper alignment and avoids side loading due to buckling. Placing the hydraulic pistons in a compression mode, rather a tension mode, subjects the associated piston rods to a buckling tendency and possible misalignment or side loading. The arrangement of the present invention, in contrast, provides tensile hydraulic rod forces to develop compressive forces at the extrusion die and the machine is therefore inherently balanced and has no overturning or unbalanced moments.

The present invention also provides certain valuable safety features since the die (which must withstand the constant and repetitive force of the ram), unlike other designs, is rigidly held in a fail-safe, sandwiched position by the opposing forces of the ram and the hydraulic cylinders. Horizontal models, such as the Tomco, have exposed, bolted dies that are subject to bolt failure and subsequent violent ejection of the die in a horizontal trajectory at personnel height.

These and other advantages of the present invention will be apparent to those of routine skill in the art of dry ice manufacture after a review of the following detailed description in view of the drawing figures.

DETAILED DESCRIPTION OF A PREFERRED EMBODIMENT

Figure 1:
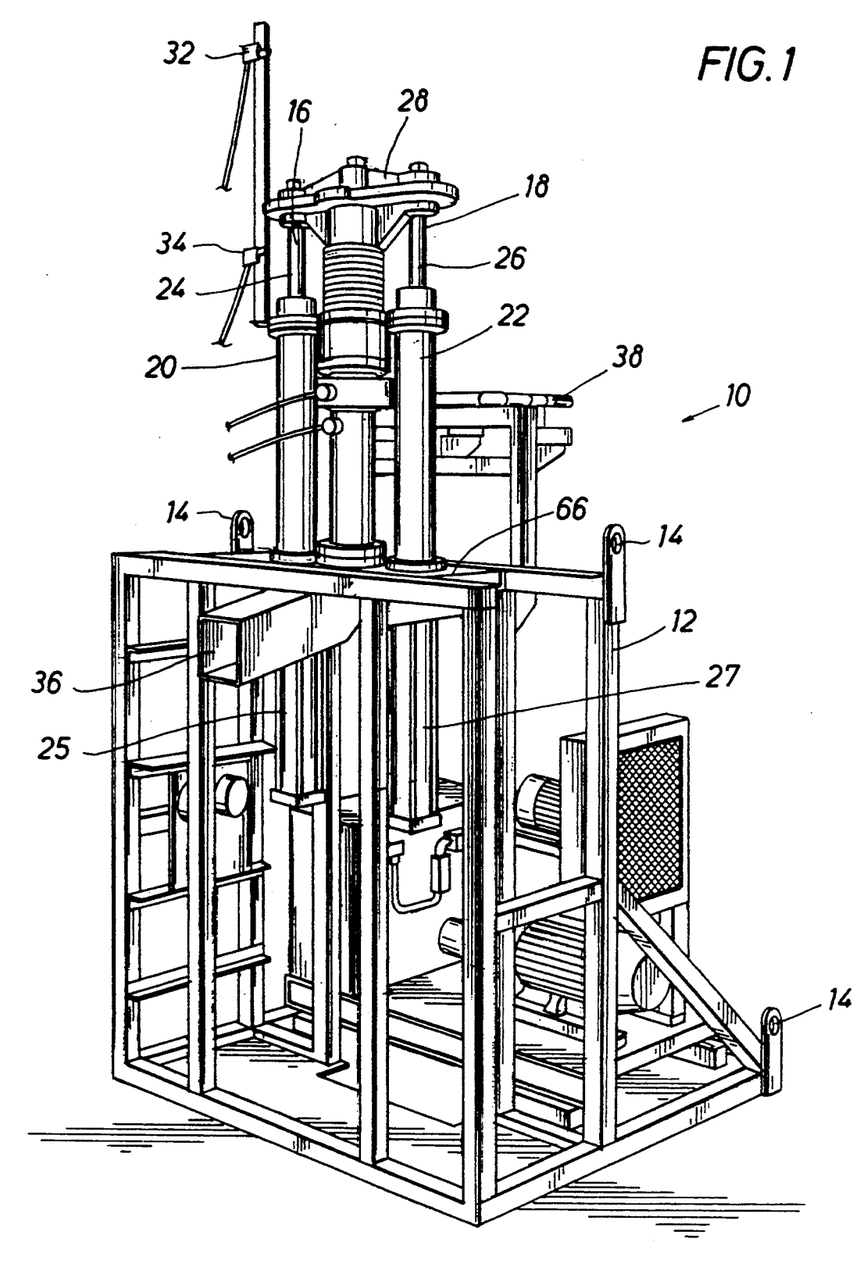
FIG. 1 provides an overall perspective view of the dry ice pelletizer of the present invention.

FIG. 1 depicts a perspective, 3-dimensional view of the dry ice pelletizer of the present invention, shown generally as 10. The portion of the apparatus that produces the dry ice pellets is supported within a sturdy yet lightweight frame 12. The frame 12 is provided with lifting eye-bolts 14 for ease of lifting the entire apparatus for palletization or skid mount and convenient portable operation.

The present invention includes a pair of hydraulically actuated side rods 16,18. The side rods 16,18 extend into rod guides 20,22, and each side rod includes an associated coupling rod 24,26. The coupling rods 24,26 mechanically couple the hydraulically actuated side rods 16,18 to a traveling crosshead 28. The crosshead 28 is in turn coupled to a ram 30, shown in FIG. 5.

Immediately below but independent from the rod guides 20,22 are a pair of matched hydraulic cylinders 25,27, mounted vertically and directly under a thick, carbon steel die table 66. These hydraulic cylinders convert the hydraulic high pressure, furnished by the hydraulic pump, into reciprocating motion. These hydraulic cylinders have a piston and rod configuration that is double acting; i.e., the hydraulic fluid is ported to both sides of a piston, causing the rod to reciprocate as needed by the sequential operation of the pelletizer. The standard hydraulic cylinder rods, 16,18 are modified by screwing a rod extension piece to the standard rod end supplied with the hydraulic cylinder. This allows the extended rods to reach up to the traveling crosshead 28. These two side extended rods, because of their length, are guided vertically by respective bronze bushings 76 (see FIG. 3) that act as guides to keep the reciprocating action smooth and aligned during operation. The reciprocating action of the two side rods is transferred to the ram 30 by the connected traveling crosshead 28.

The cross head 28, in addition to coupling the motive force for the formation of dry ice pellets from $CO_2$ snow, serves the additional function of contacting upper and lower limit switches 32 and 34, respectively for operational control of the system. Further as shown in FIG. 1, there are a variety of un-numbered auxiliary elements providing electrical, hydraulic, and pneumatic support with conventional devices in a manner well known in the mechanical arts.

The dry ice pellets are removed from the pelletizer by a pellet chute 36, for example, where the pellets exit the apparatus by gravity into an insulated receptacle bin at floor level.

Figure 2:
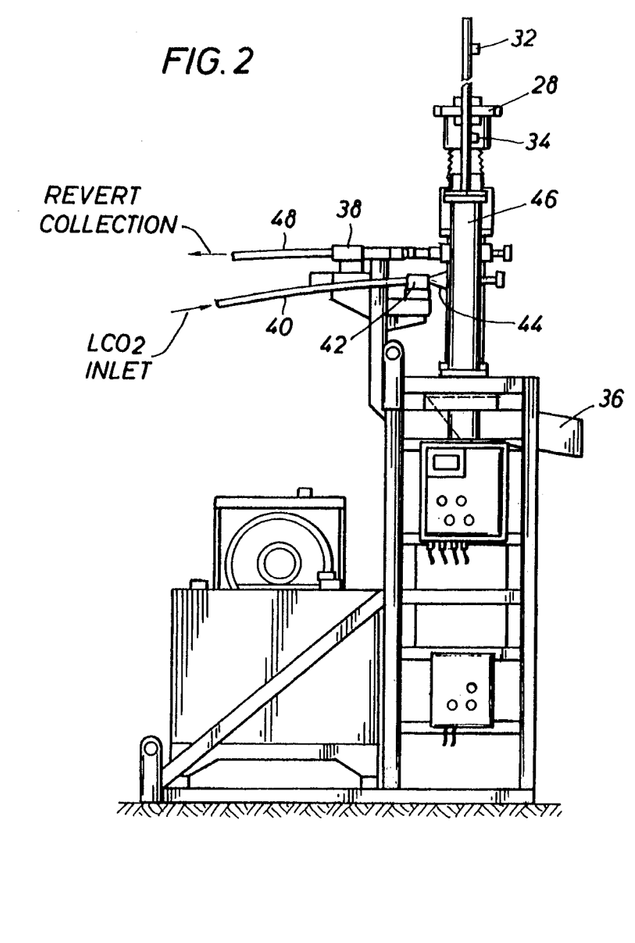
FIG. 2 is a side elevation view of the present invention.

A revert outlet 38, shown in more detail in FIG. 2, provides for the removal of revert or gaseous $CO_2$, as described in greater detail below. The revert outlet 38 preferably includes quick-coupling connections since the pelletizer of the present invention is preferably intended for conveniently portable operation.

FIG. 2 provides a side view of the present invention. A liquid carbon dioxide ($LCO_2$) inlet line 40 provides $LCO_2$ to a pneumatically operated ball valve 42, shown in greater detail in FIG. 8. The ball valve 42 intermittently feeds liquid $CO_2$ into a preferably substantially cone-shaped expanding inlet segment or nozzle 44, although the nozzle 44 may have any appropriate cross-sectional shape so long as the cross-sectional area of the nozzle increases toward a snow chamber 46. This structure for the inlet feed nozzle segment provides the advantage that, as the $LCO_2$ expands into the snow chamber 46, any residual solid snow that remains in the nozzle portion between the valve outlet and the snow chamber inner wall will subsequently be easily blown into the chamber upon the next opening of the feed valve, thus avoiding plugging problems that are characteristic of prior art dry ice machines.

The revert 38 further couples to a revert collection line 48 (or lines) that carries away gaseous $CO_2$ for reclamation and recycle as described in further detail below.

Figure 3:
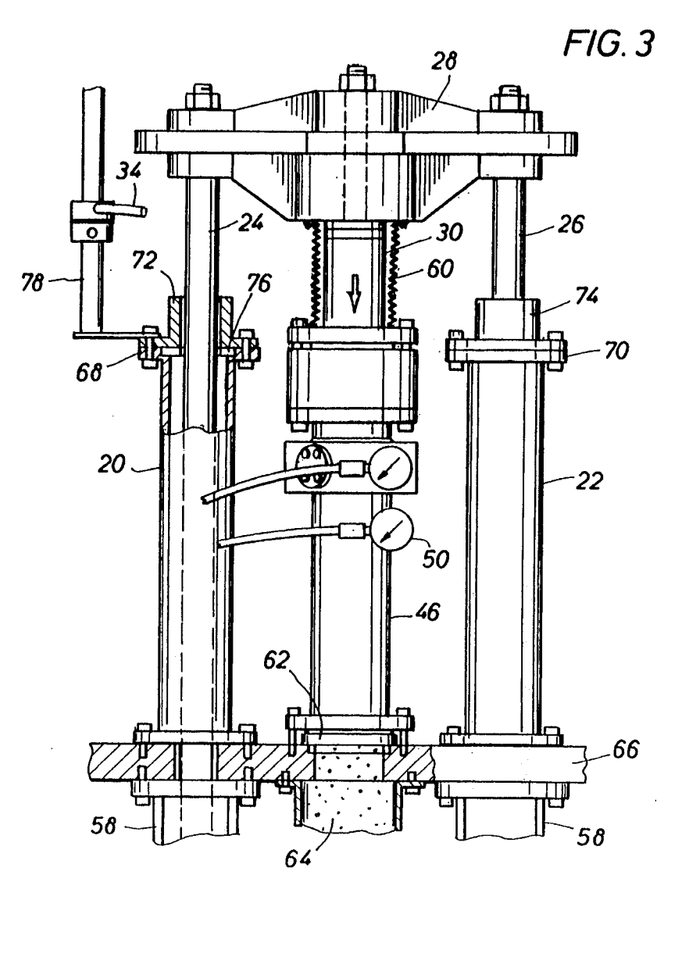
FIG. 3 is a front elevation view showing details of the present invention in partial section.

FIG. 3 depicts a front elevation view with further details of the pelletizer 10. The pelletizer includes a pair of rod guides 20,22, each with an associated coupling rod 24,26. The coupling rods couple to the traveling cross head. Below each extension is a hydraulic cylinder 58 and each cylinder includes an upper hydraulic port and a lower hydraulic port in a manner known in the art (not shown). It is important to note that all of the hydraulics are located at a level below the snow chamber such that any leakage of hydraulic fluid cannot contaminate the dry ice product. To force the ram 30 (see FIG. 5) down in the direction shown by the arrow in FIG. 3, hydraulic fluid is forced under pressure into the upper port and allowed to bleed from lower port. The action places a tensile force on the coupling rods 24,26. This structure eliminates the tendency of the coupling rods to buckle under compressive force as is normally done in hydraulic systems. Splitting the duty between a pair of coupling rods 24,26 also permits the utilization of the rods and hydraulic cylinders from standard size, commercially available materials.

Figures 4, 5:
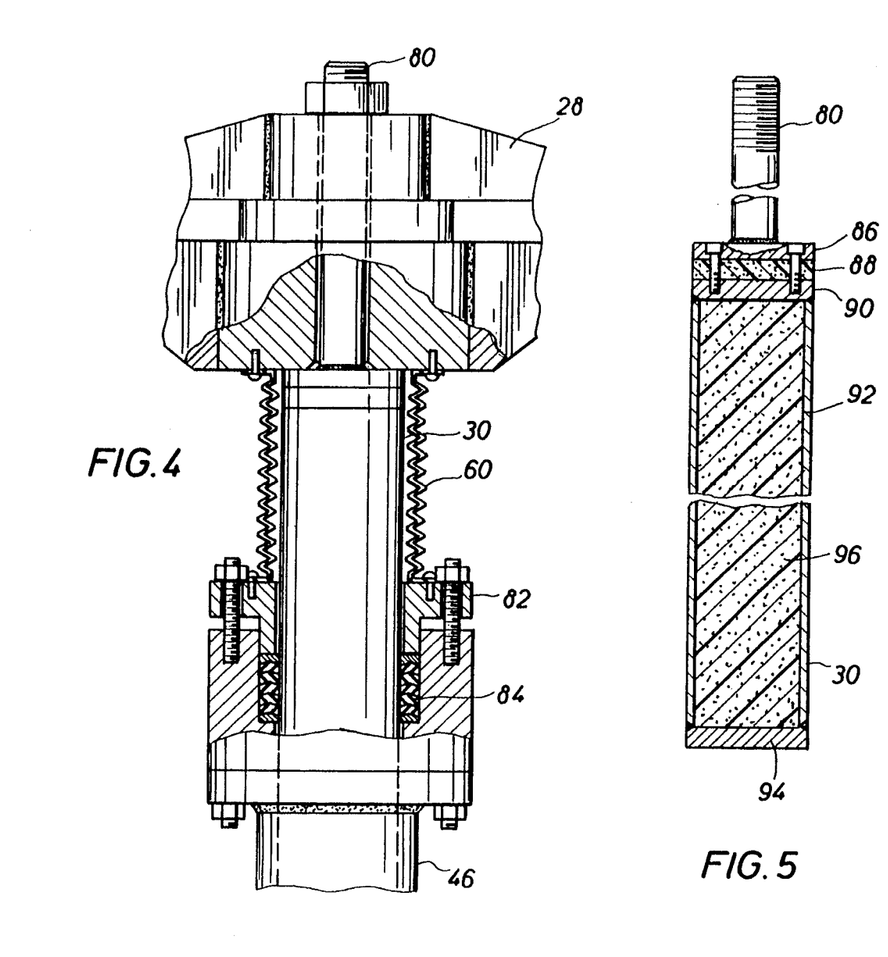
FIG. 4 provides further details of a ram and supporting elements in a dry ice pelletizer of the present invention.
FIG. 5 is a section view of the ram.

The ram 30 is sealed within a flexible rubber boot 60 (see FIG. 4). The ram 30 preferably has a relatively large clearance, for example ⅛" clearance, between the outer surface of the ram 30 and the inside wall of the snow chamber 46. This eliminates wear products that might otherwise have been created by rubbing action of the ram against the snow chamber.

As the ram 30 is forced in the downward direction, it compacts the snow in the snow chamber against a die 62 to form $CO_2$ pellets 64 which fall out the pellet chute by gravity. The die 62 is shown and described in greater detail with regard to FIG. 6.

The rod guides 20,22, cylinders 58, coupling rods 24,26, cross head 28, ram 30, snow chamber 46, and the associated apparatus are all supported by a relatively massive and rigid die table 66. The snow chamber 46 may be attached to the die table 66 by any appropriate means but is preferably bolted to the die table to facilitate ease of maintenance and to permit quick and easy replacement of the removable die 62.

The upper ends of the rod guides 20,22 terminate in flanges 68,70. The flanges 68,70 mate with guide collars 72,74 by, for example, bolting. Recessed into the flanges 68,70 and clamped down by the guide collars 72,74 is a guide ring 76 (only shown in association with flange 68), preferably made of brass, to provide smooth movement of the coupling rods 24,26. The guide collar 72 may also serve as a mount for a support structure 78 for the limit switch 34.

FIG. 4 provides a partial section view of the traveling cross head 28 coupled to the portion of the ram 30 that extends above the snow chamber 46. The ram 30 is coupled to the cross head 28 by any appropriate means, preferably by a large extended bolt 80 that extends from the top of and is integral with the ram 30. The upper portion of the ram is sealed within a boot 60. The boot 60 at its upper end is attached to the cross head 28 and at its lower end to a packing gland 82. The packing gland 82 is used to provide adequate compression to a set of chevron-shaped packing 84, preferably of leather or other appropriate material suited to cold cryogenic temperatures and will not contaminate carbon dioxide (in any state) to which it may come in contact.

It is important to note at this point that at no time is a void space formed above the ram 30 since it is coupled to the cross head 28 which moves the ram up and down. Thus, there is no possibility of snow migrating across packing or piston rings, referred to herein as blowby, as in known systems employing a piston for the compaction of the snow.

FIG. 5 provides a section view of the ram 30. Extending above the top of the ram is a bolt 80 integral with (e.g., welded to) the top of the ram. The bolt is preferably welded to a carbon steel disc 86. Below the disc 86 is an insulator disc 88 of any appropriate material, preferably mica, with sufficient hardness, machinability, and insulating properties. The carbon steel disc 86 and the insulator disc 88 are coupled to a stainless steel disc 90 which forms the upper seal cap of the ram 30. The cylindrically shaped elongate wall 92 of the ram 30 is preferably standard size, commercially available stainless steel pipe to reduce manufacturing costs. The bottom of the ram 30 is sealed by a stainless steel disc 94 which may be welded to the wall 92. The void space 96 within the ram 30 is preferably filled with an expanded polyurethane insulation.

Figure 6:
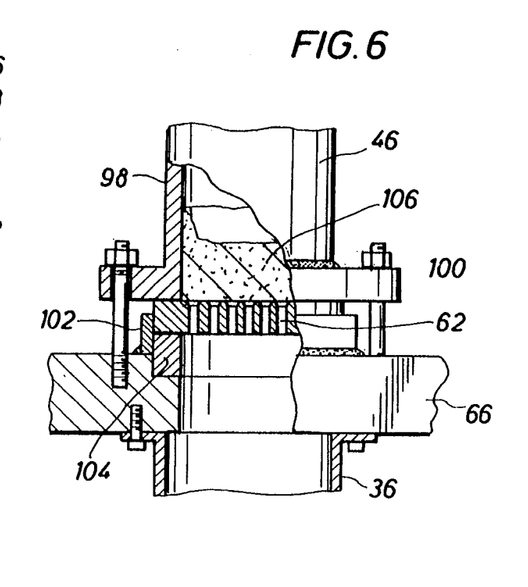
FIG. 6 is a partial section elevation view of a die and supporting elements.

FIG. 6 provides a partial section view of the bottom end of the snow chamber 46, the die 62, and associated hardware. The snow chamber 46 includes a snow chamber wall 98. The snow chamber wall is attached, as by welding, to a flange 100 which has a hole therethrough of the same diameter as the inside diameter of the show chamber wall 98. The flange 100 is preferably bolted to the table 66. The flange 100 also rests on top of the outer periphery of the die 62. The die 62 fits within a retaining barrier 102. beneath the die 62 and of the same diameter as the die is an insulator ring 104 which fits into a recess formed in the die table 66. Coupled to the bottom of the die table 66 directly below the die 62 is the pellet chute 36.

After initial startup of the pelletizer, an ice plug 106 is formed which seals the bottom of the snow chamber for the subsequently deposit of snow. Then, as more $LCO_2$ is admitted into the snow chamber forming more snow, the ram is forced down against the ice plug 106 thus extruding pellets through the die.

Figure 7:
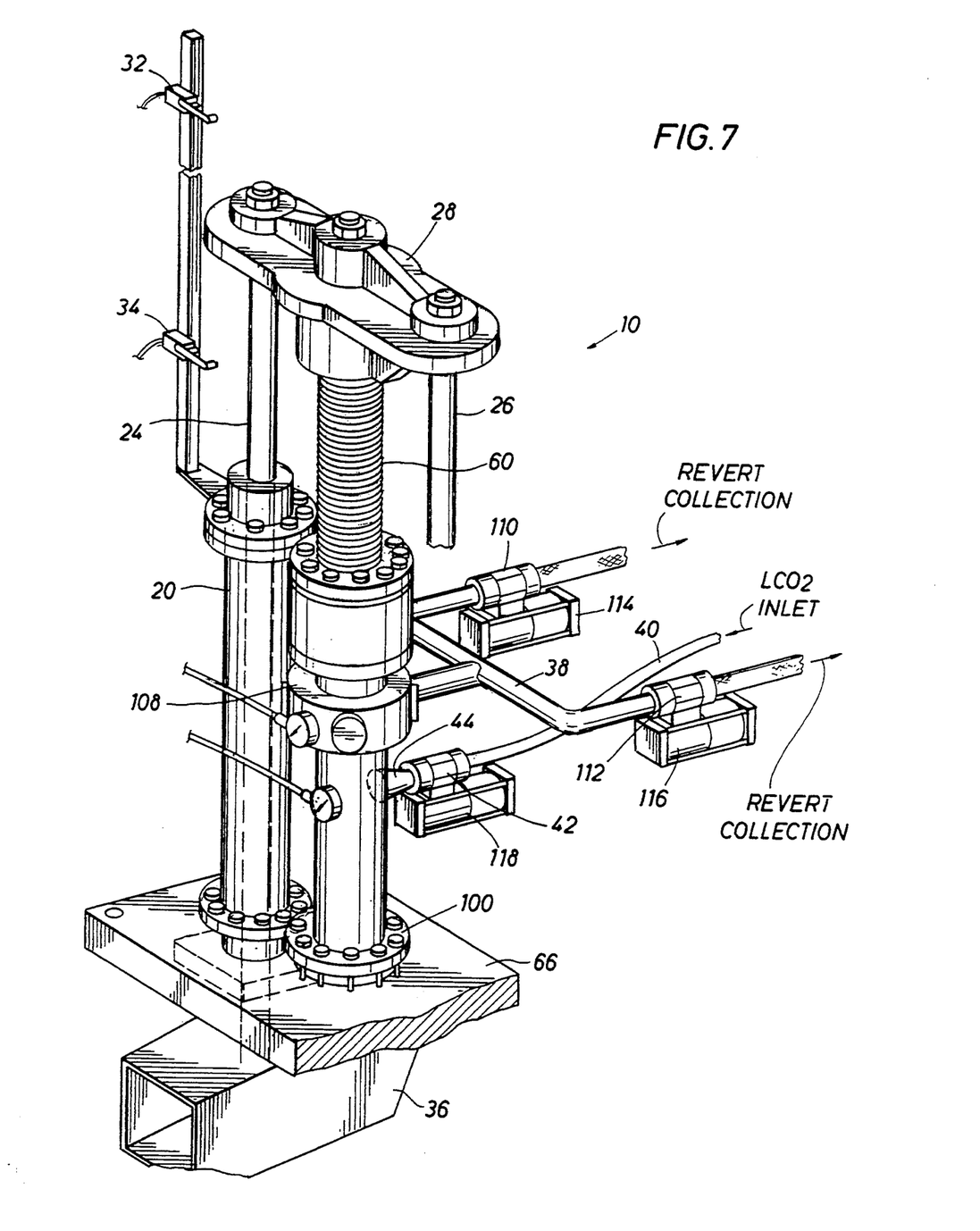
FIG. 7 is a partial cutaway perspective view showing further details of the liquid carbon dioxide supply and revert.

FIG. 7 depicts a perspective view of the pelletizer 10 with further details of the $LCO_2$ supply and revert collection systems. The $LCO_2$ is supplied via the inlet line 40 which connects to the ball valve 42 which in turn intermittently provides $LCO_2$ to the inlet nozzle 44, all of which is shown in greater detail in FIG. 8.

On the collection side, the revert outlet line 38 is coupled to a revert collection header 108, which forms an annular ring around the snow chamber near the top of the snow chamber. The revert collection header 108 provides a plurality of maintenance access ports to ensure the free flow of revert into the collection chamber 108 and the revert collection system. The revert collection header 108 and its adjacent structure are shown in greater detail in FIG. 9.

Figure 8:
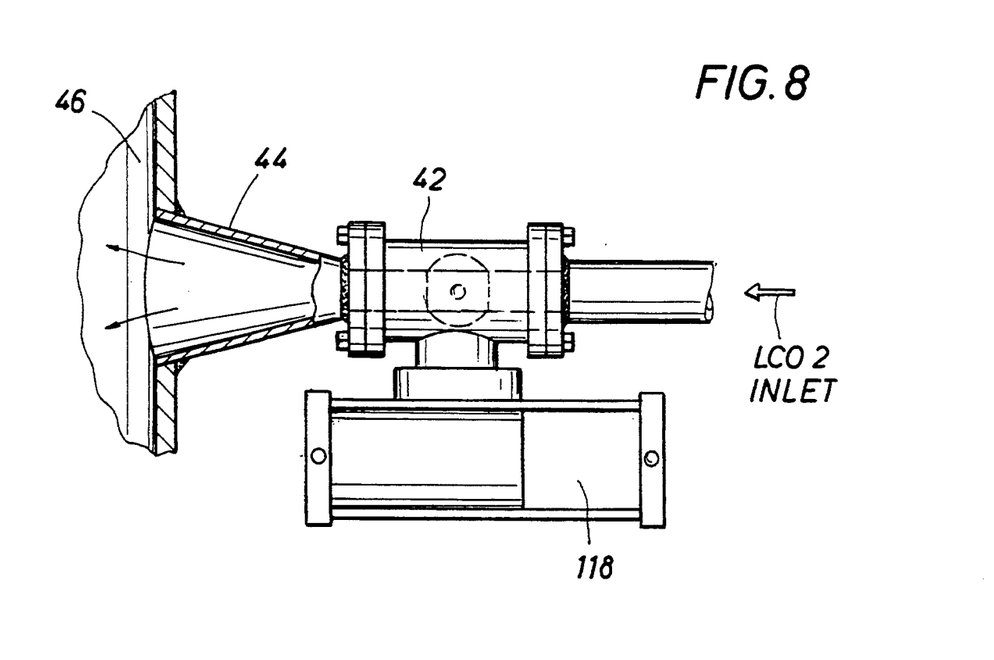
FIG. 8 is a partial section view of the liquid $CO_2$ supply inlet.

FIG. 8 provides a partial section view with further details of the inlet nozzle 44 and the inlet control valve 42. The inlet control valve includes an actuator 118 of any suitable type. As previously noted, the inlet nozzle 44 is preferably substantially conical but may be of any cross-sectional shape so long as the diameter of the nozzle increases toward the snow chamber to eliminate plugging of the nozzle with solid $CO_2$ as the $LCO_2$ flashes.

Figure 9:
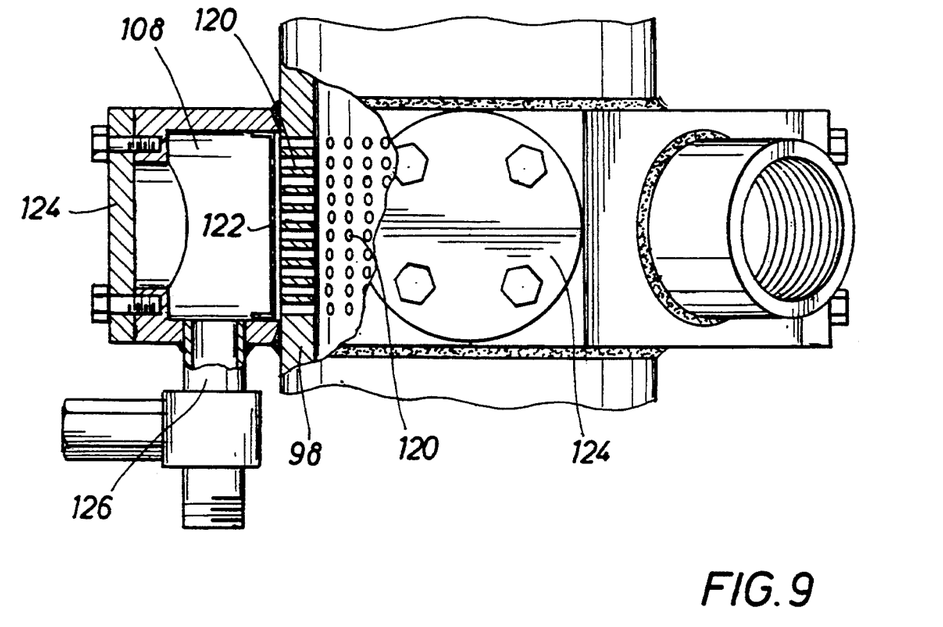
FIG. 9 is a partial section elevation view of maintenance access ports in the present invention.

FIG. 9 provides a partial section view with further details of the annular revert collection header 108. In operation, revert is collected from the snow chamber into the revert collection header through a large number of holes 120 in the snow chamber wall 98. Outside the holes 120 is a stainless steel fine mesh wire screen 122 to prevent fine solid $CO_2$ from passing into the revert header. Spaced about the revert collection header 108 are a plurality of access covers 124 providing access into the collection chamber for access to the wire screen 122. The collection header 10 8 also has a connection port 126 thereto to provide for a relief valve, for over-pressurization protection of the snow chamber. The connection port 126 may be located wherever it is convenient.

Figure 10:
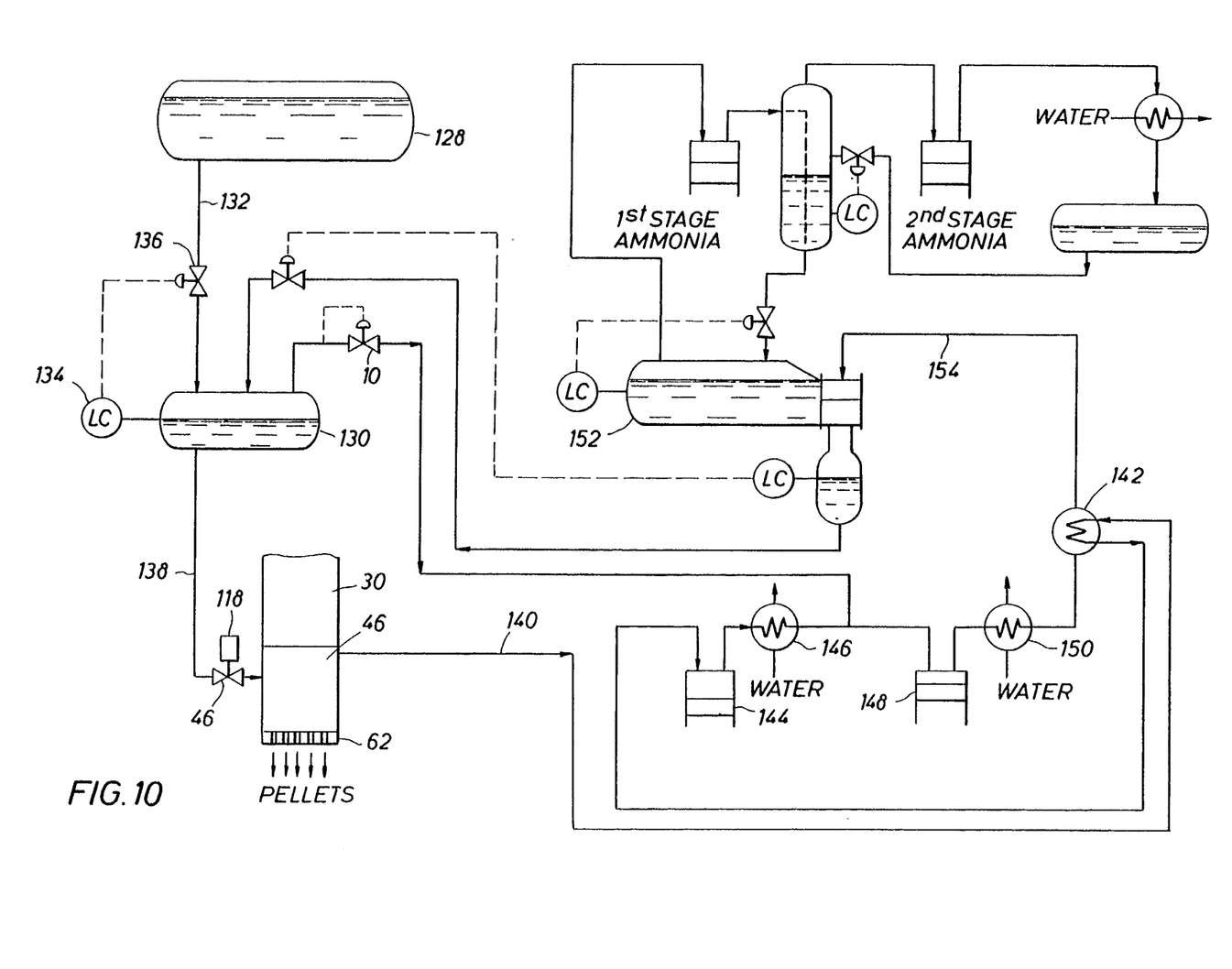
FIG. 10 is an overall process flow diagram of a pelletizer including a $CO_2$ revert recovery system.

FIG. 10 provides an overall system diagram for the pelletizer of the present invention and supporting $CO_2$ supply and revert recovery systems. The $LCO_2$ is provided from a storage tank 128, typically at 250 psig and $-8°$ F. From the storage tank 128, the $LCO_2$ is provided to an intermediate stage evaporator 130 over a supply line 132 by the difference in pressure between the storage tank 128 and the evaporator, preferably at 115 psig (substantially below 250 psig) and $-45°$ F. (substantially below $-8°$ F.), and may be enhanced by gravity. The colder temperature in the evaporator significantly enhances the yield of solid $CO_2$ in the form of snow in the pelletizer. The level in the evaporator 130 is controlled by a standard level control device 134 that controls the admission of $LCO_2$ via a supply valve 136.

Liquid $CO_2$ is supplied from the evaporator 130 to the pelletizer via a supply line 138 through the ball valve 46 under the control of actuator 118. The $LCO_2$ enters the pelletizer at essentially atmospheric pressure where is flashes yielding solid $CO_2$ as snow and gaseous revert. The solid $CO_2$ is taken off as pellets as previously described and the gaseous revert is taken off for reclamation via revert collection line(s) 140 to a heat exchanger 142. The heating medium in the heat exchanger 142 is $CO_2$ which has been cooled and compressed. The heated revert is then compressed in a first stage $CO_2$ compressor 144, cooled in a heat exchanger 146, compressed again in a second stage $CO_2$ compressor 148, and cooled in a heat exchanger 150. The $CO_2$ exiting the heat exchanger 150 is used as a heating medium in the heat exchanger 142, as previously described, from whence it flows to a condenser 152 through a transfer line 154. There, the revert is cooled and condensed to a liquid state by a standard ammonia cooling system as shown. The condensed and now reclaimed $CO_2$ is then fed to the evaporator 130 to rejoin the $CO_2$ supply.

Figure 11:
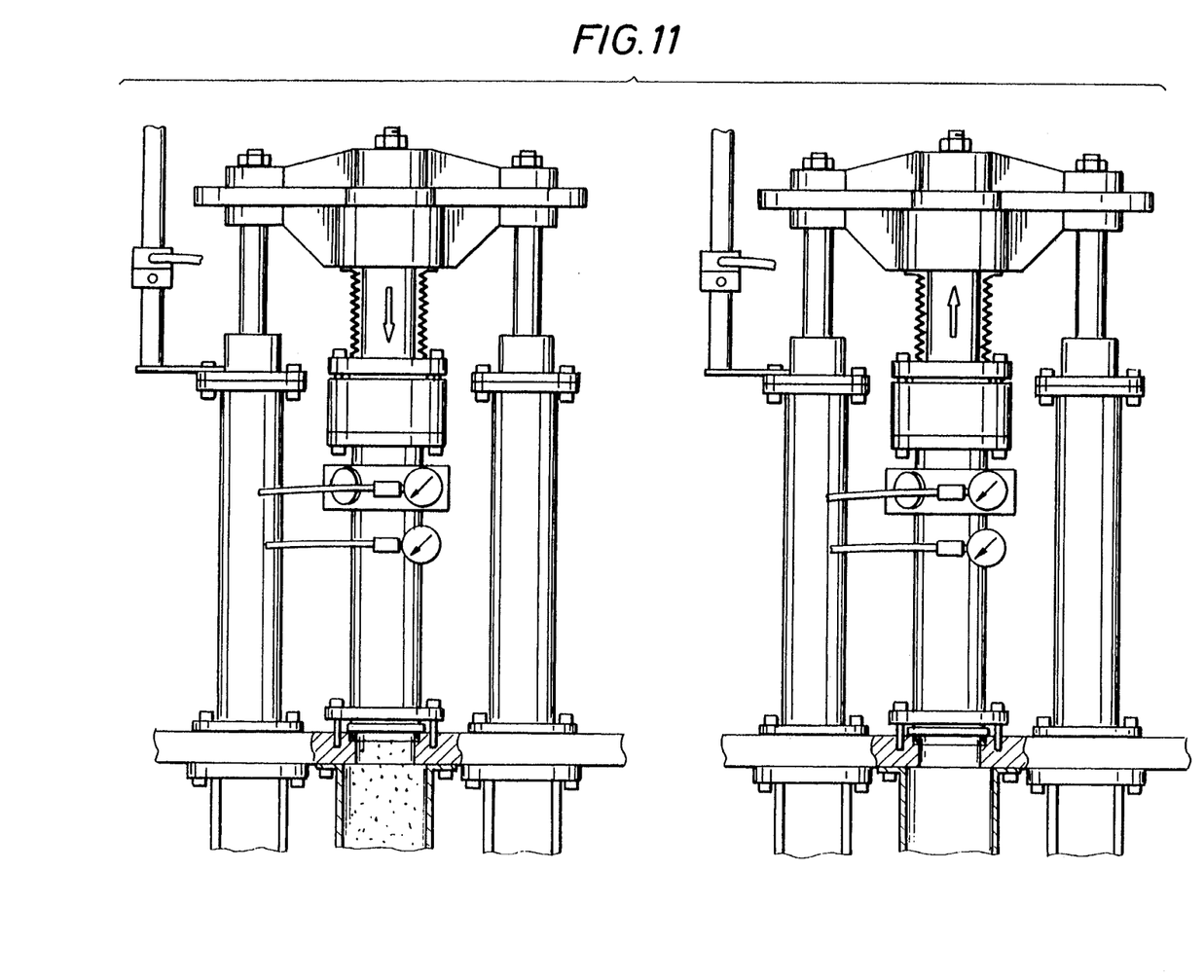
FIG. 11 is a front elevation view showing details of the present invention in partial section including a plurality of ram arrangements.

As shown in FIG. 11, the pelletizer preferably comprises two units in parallel. This effectively doubles the capacity of the system while advantageously using a single support system including $CO_2$ supply and hydraulic power system. FIG. 10 depicts how such a pelletizer is arranged. The arrows in FIG. 10 indicate that when the left-hand unit is compacting snow into pellets, the right-hand unit is retracting and vice versa. All other components function as those described in relation to FIG. 3. In addition to increasing the capacity of the system, this arrangement provides the advantage of providing a more constant supply of $CO_2$ pellets as well as a steady supply of revert, again reducing the length of time necessary to produce a given quantity of pellets, thereby reducing sublimation losses. However, as used herein, the term "snow chambers in parallel" includes two or more snow chambers operating in parallel, whether or not they have a common source of $LCO_2$, a common source of hydraulic power, a common control system, or any combination of them.

In a preferred embodiment, each of the two snow chambers is powered by its respective pair of hydraulic cylinders. Both pairs of hydraulic cylinders are fed hydraulic fluid (oil) by a common hydraulic pump operating in a pressure compensation mode, commonly known and used in the hydraulic industry. The alternating operation of the two snow chambers is such that one chamber is being fed $LCO_2$ and exhausting its revert vapors, while the other snow chamber is subjected to compaction and extrusion of the dry ice as well as to retraction of its ram. By controlling these actions through the use of limit switches, pressure switches, and timer relays, a minimum of idle time is realized by either of the two snow chamber/ram combinations. The overall effect is a steady, alternating production of dry ice pellets and a constant and steady flow of revert vapors to the recovery portion of the system. This steady revert flow produces a cost efficient size of $CO_2$ recompressor as well as refrigeration unit.

Figure 12:
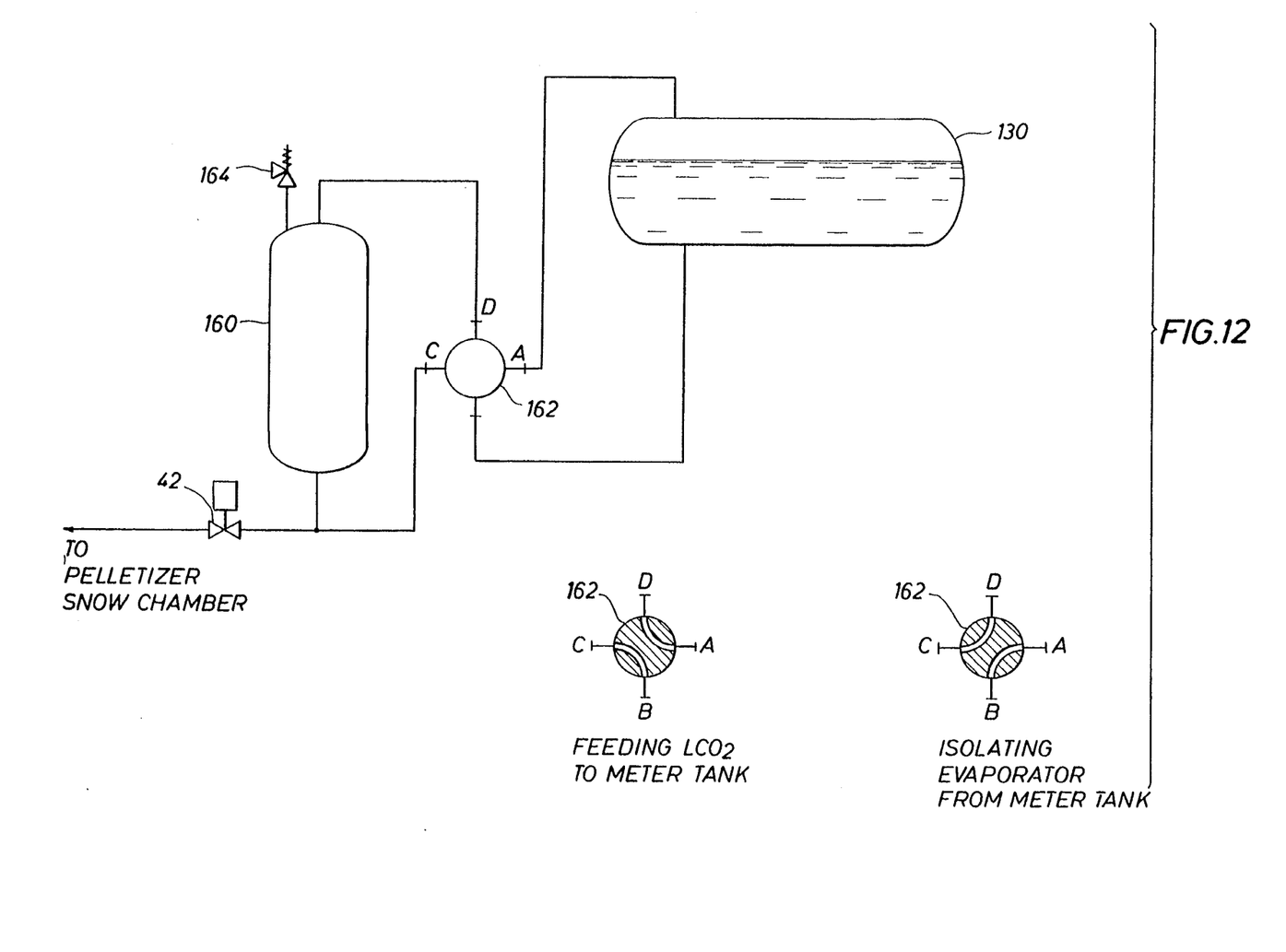
FIG. 12 is a system diagram depicting a metering feature of a preferred embodiment of the present invention.

FIG. 12 depicts a portion of the pelletizer system that provides for a predetermined metered quantity of dry ice pellets. The $LCO_2$ evaporator provides a specific quantity of liquid to an $LCO_2$ meter tank 160 through a 4-way valve 162. With ports A and D aligned and ports B and C aligned, $LCO_2$ flows into the meter tank 160. Once the meter tank 160 is full (of a precise and predetermined quantity of liquid), the 4-way valve 162 is realigned to align ports A and B and ports C and D as shown in FIG. 12. The pelletizer system is then ready for operation with feed valve 42 as previously described. The system of FIG. 12 also includes a safety relief valve 164 with override by fail-safe rupture disc in a manner known in the art.

The principles, preferred embodiment and mode of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

I claim:

1. A food-grade dry ice pelletizer, comprising:
   a. vertically oriented snow chamber;
   b. a supply line coupled to the snow chamber to provide liquid $CO_2$ intermittently to the snow chamber;
   c. an axially movable ram within the snow chamber and separated from the snow chamber by an annular clearance space;
   d. actuators mechanically coupled to the ram to impart motive force to the ram; and
   e. a die beneath the snow chamber to form dry ice pellets upon actuation of the ram by the actuators.

2. The pelletizer of claim 1 wherein the actuators are hydraulic actuators.

3. The pelletizer of claim 2 further comprising a source of hydraulic fluid under pressure coupled to the actuators.

4. The pelletizer of claim 1 wherein the die is removably held in place in part by a keeper plate.

5. The pelletizer of claim 1 wherein the die is removably held rigidly in place by opposing forces of the ram and the actuators.

6. The pelletizer of claim 1 further comprising a horizontal cross-head coupled at its center to the ram and coupled at its ends to the actuators such that tensile force on the actuators actuates the ram.

7. The pelletizer of claim 1 further comprising a control system coupled to the pelletizer providing automatic operation.

8. The pelletizer of claim 1 further comprising a second vertically oriented snow chamber in parallel with said snow chamber, each snow chamber having its own hydraulic cylinders and each snow chamber working alternately.

9. The pelletizer of claim 1 further comprising an inlet nozzle coupling the supply line to the snow chamber.

10. The pelletizer of claim 9 further comprising an inlet control valve coupling the inlet nozzle to the supply line.

11. The pelletizer of claim 1 further comprising a revert collection system for the reclamation of gaseous carbon dioxide from the snow chamber.

12. The pelletizer of claim 1 wherein each actuator is vertically oriented and comprises:
   a. cylinder;
   b. an elongate coupling rod coupling the actuator to the ram;

c. a piston on the coupling rod between a first and a second end of the rod, the piston positioned within the cylinder;

d. a first hydraulic port into the cylinder above the piston; and e. a second hydraulic port into the cylinder below the piston.

13. The pelletizer of claim 1 further comprising a second vertically oriented snow chamber in parallel with said snow chamber with a ram in each snow chamber and an actuator coupled to each ram and wherein each actuator is vertically oriented and comprises:

a. a cylinder;

b. an elongate coupling rod coupling the actuator to the ram;

c. a piston on the coupling rod between a first and a second end of the rod, the piston positioned within the cylinder;

d. a first hydraulic port into the cylinder above the piston; and e. a second hydraulic port into the cylinder below the piston; such that, when one ram is moving up, the other ram is moving down.

14. The pelletizer of claim 1 wherein the liquid $CO_2$ is fed at a pressure substantially below 250 psig and a temperature substantially below $-8°$ F.

15. A method of manufacturing food-grade dry ice pellets comprising the steps of:

a. porting a quantity of liquid $CO_2$ into a vertical snow chamber to form a quantity of dry ice snow and a quantity of gaseous $CO_2$ revert;

b. actuating a set of hydraulic cylinders mechanically coupled to a ram within the snow chamber and separated from snow chamber by an annular clearance space such that the hydraulic cylinders pull the ram into compressive contact with the dry ice snow to compact the snow; and c. extruding the compacted snow through a die plate to form dry ice pellets.

16. The method of claim 16 further comprising the step of repeatedly performing steps a, b, and c.

17. The method of claim 10 further comprising the step of collecting the revert and condensing the revert for later use to form dry ice pellets.

18. The method of claim 16 further comprising the step of operating a pair of pelletizers alternately in parallel.

19. A system for the production of food-grade dry ice pellets comprising:

a. plurality of dry ice pelletizers, each pelletizer comprising:

i. vertically oriented snow chamber:

ii. a common supply line couplable to each snow chamber to provide liquid $CO_2$ intermittently to the snow chamber from the common supply;

iii. an axially movable ram within the snow chamber separated from the snow chamber by an annular clearance space;

iv. actuators mechanically coupled to the ram to impart motive force to the ram; and v. a die beneath the snow chamber to form dry ice pellets upon actuation of the ram by the actuators; and b. a revert collection system for the reclamation of gaseous carbon dioxide from the snow chamber.

20. The system of claim 19 wherein the liquid $CO_2$ is fed at a pressure substantially below 250 psig and a temperature substantially below $-8°$ F.

* * * * *